(12) United States Patent
Anderson (10) Patent No.: US 6,347,753 B1
(45) Date of Patent: Feb. 19, 2002

(54) ZERO VELOCITY SPREADING SYSTEM FOR DISTRIBUTING PARTICULATE MATERIAL

(75) Inventor: Robert M. Anderson, New London, MN (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/531,924

(22) Filed: Mar. 21, 2000

(51) Int. Cl.$^7$ .............................. A01C 19/00; A01C 3/06

(52) U.S. Cl. ........................... 239/677; 239/67; 239/71; 239/589; 239/666; 239/675; 239/687; 239/689

(58) Field of Search .............................. 239/67, 71, 650, 239/661, 663, 664, 665, 666, 672, 674, 675, 677, 679, 680, 681, 684, 687, 688, 689, 589

(56) References Cited

U.S. PATENT DOCUMENTS

| | | | | |
|---|---|---|---|---|
| 3,443,763 A | * | 5/1969 | Wolford | 239/666 |
| 3,926,377 A | * | 12/1975 | Johnson | 239/689 X |
| 4,124,167 A | | 11/1978 | Coleman | |
| 4,340,182 A | * | 7/1982 | Parke et al. | 239/689 X |
| 4,373,668 A | * | 2/1983 | Forbes et al. | 239/677 X |
| 4,385,729 A | * | 5/1983 | Wiederkehr | 239/689 |
| 4,469,210 A | | 9/1984 | Blumere et al. | |
| 4,491,275 A | | 1/1985 | Holsworth | |
| 4,568,028 A | | 2/1986 | Verseef et al. | |
| 4,577,781 A | | 3/1986 | Braun | |
| 5,318,226 A | * | 6/1994 | Kime et al. | 239/687 X |
| 5,340,033 A | | 8/1994 | Whitell | |
| 5,375,773 A | | 12/1994 | Lewis | |
| 5,677,671 A | | 10/1997 | Pabla et al. | |
| 5,842,649 A | | 12/1998 | Beck et al. | |
| 5,904,296 A | * | 5/1999 | Doherty et al. | 239/675 |
| 5,931,393 A | | 8/1999 | Alsip et al. | |

OTHER PUBLICATIONS

"Salt and Sand Spreader"; 1–pg. document; [obtained from Internet URL www.dpi–np.com]; [Date Unknown].

"Falls 1ASD6 6"Auger Direct Drive Spreader and "FALLS® 6" Direct Drive Single Auger Hydraulic Tailgate Spreader; 2–pg. document; [obtained from Internet URL www.fallsplows.com]; [Date Unknown].

"Mini Salt Spreader"; 5–pg. document; [obtained from Internet URL www.angelos–supplies.com]; [Date Unknown].

"Spreader for Sand, Salt and Other Materials"; 3–pg. document; © Forshaga Bil & Maskinaffär; [obtained from Internet www.novanik.se/eng/fsp.htm]; [Page last updated: Dec. 19, 1998 07:04:20].

"Zero Velocity Operators Manual/Tailgate"; 1–pg. document; Team Tyler; [Date Unknown].

"Zero Velocity Parts Manual/Tailgate"; 1–pg. document; Team Tyler; [Date Unknown].

"Zero Velocity Owner's Manual"; 1–pg. document; Team Tyler Ice, Division of IBOCO; Tyler ICE, Benson, Minnesota; [Date Unknown].

(List continued on next page.)

Primary Examiner—Steven J. Ganey
(74) Attorney, Agent, or Firm—Foley & Lardner (57) ABSTRACT

A vehicle-mounted spreader for distributing material onto a surface while the vehicle is in motion across the surface includes a discharge spout for directing the material being distributed onto the surface and a rotor coupled to the discharge spout for propelling the material into the discharge spout. The rotor has an axis of rotation that is substantially parallel to the surface. A rotor motor is coupled to the rotor to supply power to rotate the rotor. A conveyor such as an auger is coupled to the rotor and powered by a conveyor motor. The conveyor transports and meters material before the material enters the rotor. A closed-loop control system adjusts the speeds of the individual components so that a desired amount of material exits the discharge spout at zero velocity relative to the road.

24 Claims, 3 Drawing Sheets-

OTHER PUBLICATIONS

"Under Tailgate Spreader"; 2–pg. document; Hiniker (Hiniker Company); 5/93.

"Spreaders for 1–Ton Trucks"; 2–pg. document; Gledhill (Gledhill Road Machinery Co.); [Date Unknown].

"Swenson S–Series Tailgate Spreaders"; 1–pg. document; Swenson Spreader; [Date Unknown].

"TGS–II Hydraulic Drive Tailgate Spreader"; 2–pg. document; Henderson Chief (Henderson Manufacturing Company, Div. of Willknight, Inc.); [Date Unknown].

Zero Velocity V–Box Owner's Manual; 1–pg. document; Team Tyler Ice, Division of IBOCO; Tyler ICE, Benson, Minnesota; [Date Unknown].

"Truck Mounted Hopper Spreaders"; 2–pg. document; Hiniker (Hiniker Company); [Date Unknown].

"Swenson Precision Placement System"; 1–pg. document; Swenson Spreader; [Date Unknown].

"FSH Ice Control Spreader/FSH Hydraulic Sand & Salt Spreader"; 1–pg. document; Henderson Chief (Henderson Manufacturing Company, Div. of Willknight, Inc.); [Date Unknown].

* cited by examiner

ZERO VELOCITY SPREADING SYSTEM FOR DISTRIBUTING PARTICULATE MATERIAL

TECHNICAL FIELD

The present invention relates generally to systems for spreading particulate material. More specifically, the present invention relates to a vehicle-mounted spreader for distributing particulate material such as sand or salt onto a surface in an even manner while the vehicle is in motion across the surface.

BACKGROUND OF THE INVENTION

Trucks are often used to spread various materials on road surfaces during inclement weather. For example, dump trucks often include a storage bin for carrying particulate material such as salt or sand and a spreader for distributing the particulate material onto the surface of a road during snow and ice storms. When such a truck is in motion on a highway or other road surface, the particulate material flows from the storage bin into the spreader, and is then distributed by the spreader behind the truck for deposit onto the surface of the road. The material so distributed improves the traction on the road for other vehicles.

Although many arrangements for such vehicle-mounted spreaders are known, most share common deficiencies. In many cases, the material being spread is ejected from the back of the truck at a constant velocity independent of the speed of the vehicle with respect to the ground, and the material is not spread in a direction opposite to that of the vehicle. This typically causes the material to impact the road surface with a nonzero velocity, with the material "rolling" across the road surface. This can result in an uneven distribution of material on the road and can cause certain areas of the surface to be not covered at all. In the case of icy road conditions, not having an even distribution of material will mean that certain areas of the road will not be sanded or salted, therein creating hazardous road conditions for drivers or pedestrians. Further, when the material is spread unevenly across the road surface, some of the material will often travel to the sides of the road where cars and pedestrians do not typically travel. The material that lands on the side of the road will therefore be wasted, and can also lead to excessive environmental damage to plants or other objects adjacent to the road.

There have been attempts to create zero velocity spreaders that perform an adequate job of evenly distributing particulate material. For example, U.S. Pat. No. 5,842,649 to Beck et al, discloses a conveyor arrangement with a rotary spinner, wherein the spinner rotates about an axis which is substantially perpendicular to the ground. Because a typical spinner is inclined to discharge material in all 360 degrees, a shroud is strategically placed around the spinner in the directions in which it is undesirable to have material discharged. A conveyor brings the material into the spinner, which is located between two and fourteen inches from the ground, and the spinner then propels the granular material out of a discharge spout located directly behind the spinner. A control system monitors and adjusts the speed of the conveyor and spinner in order to have the material exit the discharge spout at substantially the same speed and in the opposite direction as the vehicle's motion. This arrangement has several drawbacks, however. Because the spinner is oriented with its axis of rotation perpendicular to the ground, material is forced through the spinner in a plane substantially parallel to the ground before the material is forced into the discharge spout. This action is inefficient in that the centripetal force of the material as it travels through the spinner acts to force the material against the outer shroud instead of in a direction close to the entrance point of the discharge spout. Since the spinner is therefore required to work harder, the motor powering the spinner must provide more energy in order to have the material exit at the appropriate speed. Additionally, the horizontal spinner causes the material to be ejected into the discharge spout with a side-to-side motion relative to the direction of the vehicle, which will cause some material to impact upon the side walls of the discharge spout and also cause some lateral motion in the material as it leaves the spout. This will result in some lateral spreading of the material across the road, which is undesirable from a zero velocity spreader. Furthermore, the material guide needs to be located less than 24 inches from the ground and preferably from 2 to 14 inches from the ground surface in order to minimize the width of the path of particulate material being deposited. Finally, it is also difficult to monitor whether the material exits the discharge spout at substantially zero velocity relative to the road due to the multiple directions in which the material is being forced through the spinner.

There are other vehicle-mounted spreaders on the market which use a forced flow of air to eject materials from the back of the vehicle at zero velocity relative to the ground. Such spreaders also have their drawbacks, however. For example, the components used by such spreaders to generate the airflow which forces the material out of a discharge spout require a large amount of energy to create an airflow sufficiently strong to carry the relatively heavy granular material, such as rock salt or sand. For example, some spreaders currently being marketed require up to 25 horsepower in order to operate the spreader when the vehicle is traveling at under 30 miles per hour. Also, controlling the flow of air accurately enough to maintain a zero velocity spreading of the materials can be difficult. Air-driven spreaders also have the problem that it is difficult to accurately control the direction and speed that the materials are ejected from the vehicle. Finally, such systems are difficult to retrofit to existing vehicles such as pickup or dump trucks.

Thus, it would be advantageous to provide an improved vehicle-mounted spreader for depositing materials onto a road surface at a substantially-zero velocity relative to the road. It would also be advantageous to provide such a system wherein both the direction and the velocity of the materials being ejected can be accurately controlled so as not to result in any unwanted spreading of the material across the surface. Further, it would be advantageous to provide such a system that requires a minimum amount of energy to control the components required for spreading the materials. It would also be advantageous to provide a system for spreading granular materials at zero velocity that can be easily installed or retrofitted on a preexisting vehicle, such as a pickup truck or a dump truck.

SUMMARY OF THE INVENTION

In accordance with one embodiment of the present invention, a vehicle-mounted spreader for distributing material onto a surface while the vehicle is in motion across the surface includes a discharge spout, a rotor coupled to the discharge spout, a rotor motor coupled to the rotor, a conveyor coupled to the rotor, and a conveyor motor coupled to the conveyor. The discharge spout is located at the back of the vehicle for directing the material being distributed onto the road surface. The rotor is used to propel the material into the discharge spout. The rotor has an axis of rotation substantially parallel to the surface of the road, and is powered by the rotor motor. The conveyor, preferably in the form of an auger, is used to transport the material in specific metered amounts from a storage bin supported by the vehicle to the rotor. This conveyer is preferably powered by the conveyor motor. The rotor motor and conveyor motor are preferably hydraulically driven, and can be controlled independently of each other to provide the user with greater control over the system.

The discharge spout, which is located aft of the rotor, is oriented so as to direct the materials in a direction substantially opposite to that in which the vehicle is moving. In one embodiment of the invention, the discharge spout has an entrance or inlet opening, an exit or outlet opening and a bend or middle portion therebetween. The entrance is located directly below the location at which material exits from the rotor. The bend in the spout then alters the direction of the material so the material exiting the spout will be traveling substantially opposite the direction of the vehicle.

The spreader also includes an electronic control system for monitoring and adjusting the flow of material as it exits the vehicle. The control system includes an electronic control box. An electronic speedometer, often already provided on currently existing vehicles, provides a signal to the control box, informing it of the present vehicle speed. The control box also receives signals from the conveyer motor and/or the rotor motor indicating the rotational speeds of each motor. Alternatively, the control box can receive the signals directly from the conveyer and/or the auger representing the respective velocities. The control box also provides valve control signals to solenoid-operated electrohydraulic valves. These valves provide a controlled flow of pressurized hydraulic fluid to the conveyor and rotor motors in response to the above-mentioned valve control signals. The result of this closed loop system is that the control box provides control over the conveyer and rotor speeds by monitoring the vehicle ground speed, the conveyor motor speed and the rotor motor speed as inputs. Additionally, the hydraulics for this system will preferably require less horsepower to operate at speeds near 30 miles per hour when compared to units that use air. In another embodiment of the invention, the conveyor motor and rotor motor also include rotational speed sensors to provide feedback signals to the control box indicating the motor speeds of each.

In one embodiment, the system also includes a manual on/off switch located within the vehicle cab to give the operator additional control over the flow of the material (i.e., turning the flow on and off). Further, the spreader can include a manually-operated controller within the cab so that the operator can manually adjust the amount of material being transported by the conveyer and discharged by the rotor.

Additionally, the system may include a "wet kit option" that is commonly known in the art such that the system can operate while transporting and distributing materials such as brine.

These and other objects, advantages and features of the invention, together with the organization and manner of operation thereof, will become apparent from the following detailed description taken in conjunction with the accompanying drawings wherein like elements have like characters throughout the drawings.

DETAILED DESCRIPTION OF THE INVENTION

Figure 1:
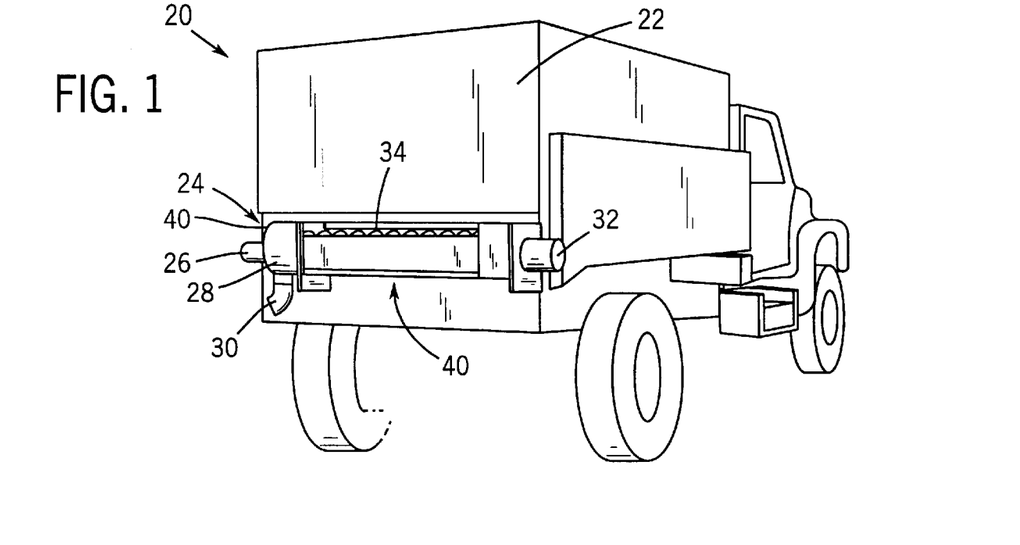
FIG. 1 is an isometric view of a material spreader in accordance with one embodiment of the invention wherein the spreader is mounted on a vehicle.

As shown in FIG. 1, a vehicle 20 (e.g., a truck) supports a material bin 22 and a material spreader 24. Spreader 24 comprises a rotor motor 26 which supplies power to rotate a rotor 28. Located generally below rotor 28 is a discharge spout 30. A conveyor 34, preferably in the form of an auger, is located along the back portion of vehicle 20 and is coupled to rotor 28. Auger 34 is powered by an auger motor 32 preferably located at the opposite end of auger 34 as rotor 28. Spreader 24 is mounted on the back of truck 20 at or near the tailgate or bed line 40.

Figure 2:
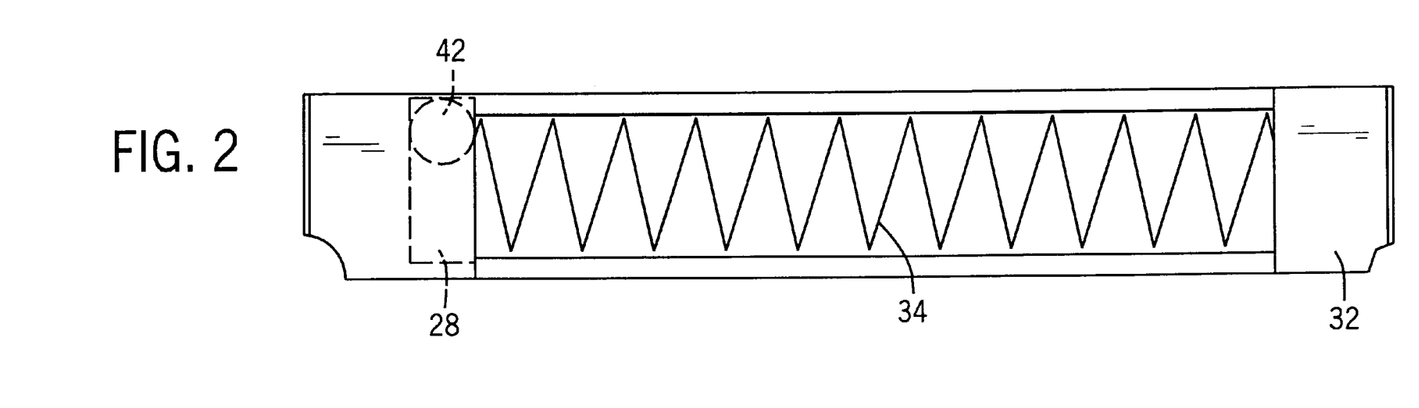
FIG. 2 is a top view of the material spreader as shown in FIG. 1.
Figure 3:
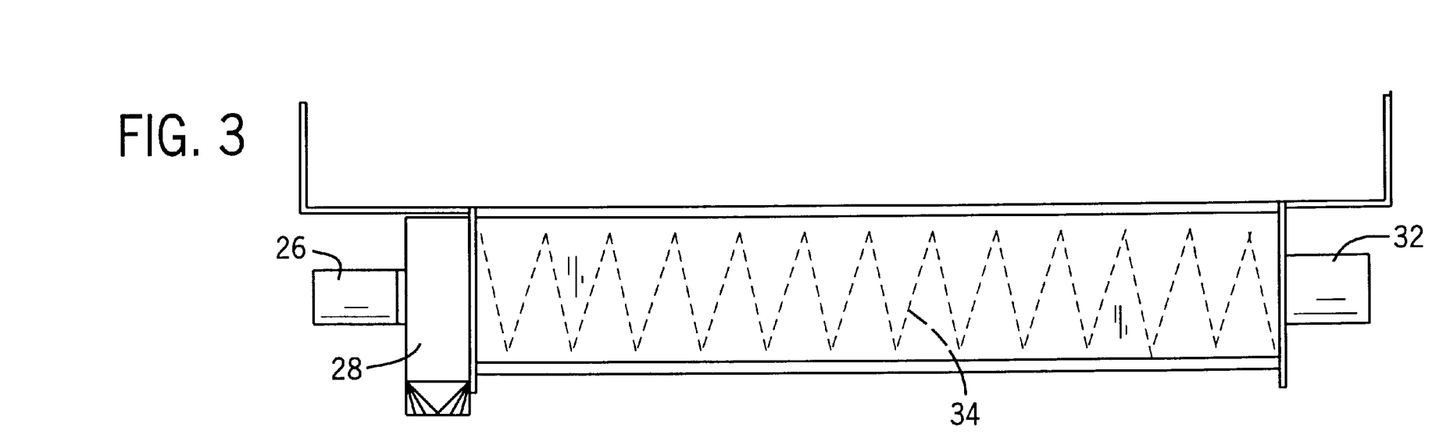
FIG. 3 is a rear view of the material spreader as shown in FIG. 1.

As shown in FIGS. 2 and 3, auger 34 is located generally at the rear of the material bin 22 with auger motor 32 located on the right side of vehicle 20. Rotor 28 is located generally on the left side of vehicle 20 with rotor motor 26 preferably on the left side of rotor 28. This arrangement is preferable because it is desirable to have the material deposited closer to the center of the road than towards the edges thereof. By having rotor 28 located on the left side of vehicle 20, the material will generally be deposited towards the median of a two-lane road or in between opposite lanes of a wider road. Rotor 28 includes an entrance point or inlet 42, into which the granular material (e.g., salt or sand) is deposited by auger 34.

In one embodiment, rotor 28 is of a spinner variety in that the interior of the rotor includes vanes (not shown) which rotate about a center axis to propel the material around rotor 28. The rotor is oriented generally such that its axis of rotation is substantially parallel to the ground and perpendicular to the forward motion of the vehicle. This rotor arrangement provides additional efficiency as compared to an arrangement wherein rotor 28 has its axis of rotation perpendicular to the ground. The vanes inside rotor 28 propel the material such that there is as little side-to-side motion of the material within rotor 28 as possible. This action aids in ensuring the material has little side-to-side velocity as it exits rotor 28 and enters discharge spout 30. If the material has significant lateral velocity, it is more likely to exit the spout 30 with a nonzero velocity relative to the ground, causing unnecessary and inefficient spreading of the material across the surface. This spreading can result in material not being evenly distributed or having some material distributed off of the road entirely.

Figure 4:
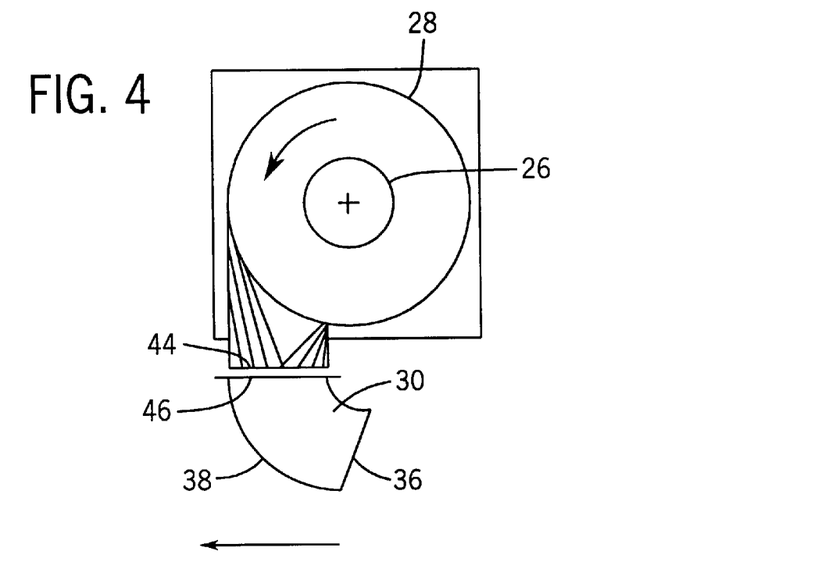
FIG. 4 is a side view of the rotor and the discharge spout arrangement of the material spreader shown in FIG. 1 in accordance with the one embodiment.

Referring to FIG. 4, located at the lower end of rotor 28 towards the front of vehicle 20 is an exit point 44 through which material will leave rotor 28 and enter discharge spout 30. Spout 30 has a first end 46 forming an inlet opening, a second end 36 forming an outlet opening, and a middle portion 38 located generally between first end 46 and second end 36. In general, discharge spout 30 is curved so the material will "fall" due to gravity and the force of being propelled by rotor 28. In general, there is no minimum or-maximum height requirement for discharge spout 30 to be located above the ground.

In one embodiment, exit point 44 of rotor 28 and first end 46 of discharge spout 30 are located directly below the back portion of rotor 28 (i.e., the portion of rotor 28 adjacent to vehicle 20). Middle portion 38 of discharge spout 30 is about 90 degrees in this embodiment, which results in second end 36 of discharge spout 30 being substantially parallel to the ground surface and pointed in the opposite direction from that in which vehicle 20 is moving. Ideally, this results in the material exiting the discharge spout 30 in the opposite direction as the vehicle 20 is moving.

Figure 5:
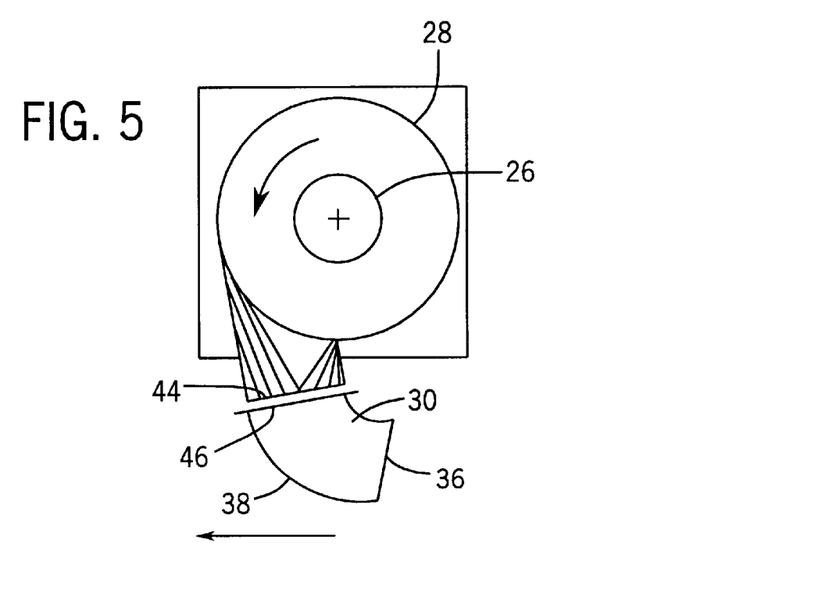
FIG. 5 is a side view of another embodiment of a rotor and discharge spout arrangement wherein the orientation and positioning of the rotor and discharge spout are adjusted (e.g., by being rotated in the counter-clockwise direction)

In another embodiment, the positioning or orientation of rotor 28 and discharge spout 30 is modified to achieve beneficial results. As shown in FIG. 5., rotor 28 is rotated slightly counter-clockwise. For example, rotor 28 can be rotated by about twenty-two degrees, although other orientations are possible. The discharge spout 30 is then modified such that the bend of middle portion 38 is less than ninety degrees. Although the exact orientation of the bend can vary, it would be matched with the orientation of rotor 28 so that the material still exits discharge spout 30 in substantially the opposite direction as the vehicle's motion. The advantage of this arrangement is that it is preferable to have the number and magnitude of bends in the spreader 24 kept to a minimum in order to ensure as straight an exit of the material from the discharge spout as possible. By having the material exit rotor 28 at a slight angle and reducing the bend of middle portion 38 in spout 30, the material in essence does not have to "turn" as much as it would in the configuration shown in FIG. 4. Additionally, decreasing the angle of the bend also will decrease the likelihood of the material becoming plugged up inside discharge spout 30, particularly when wet.

As already explained, it is possible to have different orientations for rotor 28 and discharge spout 30 to achieve this result. Discharge spout 30 also may be altered to more adequately divert material to the left and right sides of spout 30 to increase the area over which the material can be spread. This can be accomplished in a variety of manners. For example, the cross section of discharge spout 30 could be semi-circular in order to distribute the material more evenly in the lateral direction. It is also possible that spout 30 will be open on the side closest to the vehicle 20 similar to the spout on a conventional snow blower, to achieve the most uniform spread of material being discharged. The orientation and configuration of rotor 28 and spout 30 for a particular task or a particular condition can be determined empirically.

As already discussed, conveyor or auger 34 is coupled to rotor 28 and is mounted on the back of vehicle 20. Auger 34 is powered by auger motor 32 that operates independently from the rotor motor 26. In addition to discharging material into rotor 28, auger 34 also meters the material stored in material bin 22 to ensure that only a desired amount of material enter rotor 28 during a specific period of time relative to ground speed of the vehicle 20. The amount of material that is metered by auger 34 depends heavily upon the speed of auger motor 32 coupled to auger 34.

Figure 6:
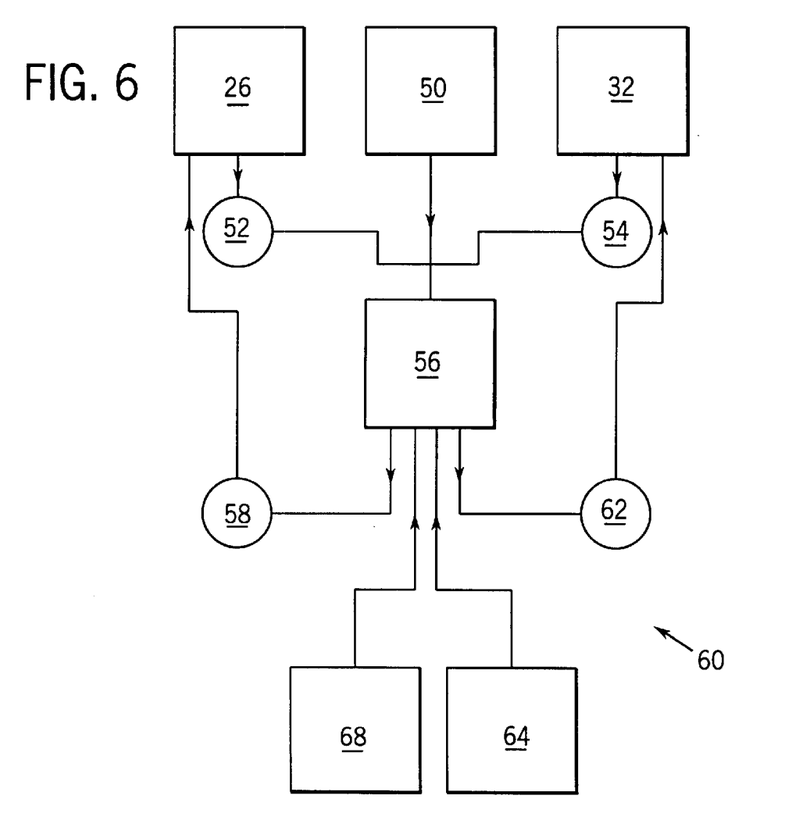
FIG. 6 is a block diagram of an exemplary control system for the material spreader shown in FIG. 1.

As shown in FIG. 6, vehicle 20 is equipped with a closed-loop control system 60 for adjusting the speeds of auger motor 32 and rotor motor 26 to ensure that the appropriate amount of material is discharged from discharge spout 30 at any given moment, and to discharge the material at zero-velocity relative to the road. Control system 60 comprises a central control box 56 that monitors the speed of auger motor 32 and rotor motor 26. In one embodiment, an auger rotational speed sensor 54 is coupled to auger motor 32 for monitoring its speed. Correspondingly, a rotor motor rotational speed sensor 52 is coupled to rotor motor 26 for measuring its speed. The two speed sensors 54 and 52 provide feedback signals indicative of the respective motor speeds to control box 56. Also, most existing salt and sanding trucks that are currently on the market are equipped with electronic speedometers 50 for measuring the speed of the vehicle with respect to the ground. The speedometer 50 is tied into the control system 60 and more directly into the control box 56.

The signals from rotor motor 26, speedometer 50 and auger motor 32 are used by control box 56 to determine how much material is exiting discharge spout 30 and whether the material is exiting discharge spout 30 at the same speed and in the opposite direction as vehicle 20. In other words, the control box monitors the degree to which the correct amount of material is being discharged at a zero velocity relative to the ground. Control box 56 uses the above mentioned variables, in addition to the dimensions of rotor 28 and/or auger 34, to determine whether the discharge rate is adequate, and to what degree the rate needs to be altered. Generally, control box 56 will attempt to match the "tip speed," or rotational velocity of the tips of rotor 28 vanes, with the speed that vehicle 20 is traveling and will match the auger speed with the desired application rate. Control box 56 performs this task either through the use of a microprocessor that calculates the applicable rates or a detailed table that includes information as to what the proper speeds of the auger motor 32 and rotor motor 26 should be for a desired application rate.

The operation of closed loop control system 60 in one embodiment is generally as follows: auger motor 32 sends a signal via auger motor rotational speed sensor 54 to control box 56. Likewise, rotor motor 26 sends a signal to control box 56 via rotor motor rotational speed sensor 52. At the same time, control box 56 receives data from electronic speedometer 50 regarding the speed of vehicle 20. Control box 56 uses this data and either calculates the current discharge rate and material exit velocity or uses a memory-stored table to determine the discharge rate and exit velocity. If the exit velocity of the material is not at the same speed and in the opposite direction as vehicle 20, or if the discharge rate does not match the desired rate, then control box 56 provides valve control signals to electrohydraulic valves 58 and 62, each being hydraulically connected to rotor motor 26 and auger motor 32 respectively. In the event that control box 56 determines that the rotor speed needs to be adjusted, control box 56 sends a signal to rotor motor electrohydraulic valve 58 which provides a controlled flow of pressurized hydraulic fluid to rotor motor 26. In one embodiment, electrohydraulic valves 58 and 62 include electronic solenoids (not shown) which help to adjust valves 58 and 62. Similar in function to rotor motor electrohydraulic valve 58, auger motor electrohydraulic valve 62 operates to adjust the controlled flow of pressurized hydraulic fluid to auger motor 32 when control box 56 determines that the speed of auger motor 32 needs to be adjusted.

Control system 60 can also include several operator controls, such as, a manual on/off switch 64 located in the cab within reach of the operator. When the switch is activated, a signal is sent to the control box which in turn either starts or stops the discharge of material from discharge spout 30. The operator can also turn a control knob which causes a potentiometer 68 to generate a desired application rate signal to control box 56. The control box in turn uses the signal to control auger motor 32 to meter the desired amount of material. This can be especially helpful because different weather and road conditions can lead to a desire for different application rates of the material while still maintaining a zero velocity.

As discussed above, once the operator has set the amount of material to be distributed per length of time, the control system 60 will monitor and adjust the different variables in order to ensure that the material exits the vehicle 20 at zero velocity relative to the road. In order to accomplish this task, the system 60 will also have to know some of the particular characteristics of the rotor motor 26 and rotor 28. In particular, the diameter of the rotor 28 and the gallons per minute of flow of oil of the rotor motor 26 will be used to determine what adjustments need to be made to the system 60. In general, the number of rotations per minute required of the rotor 28 can be determined via the equation $$\omega = \frac{(V_{vehicle})}{\pi d},$$

where $V_{vehicle}$ is measured in feet per minute and d is the diameter of the rotor in feet. For example, a vehicle 20 traveling at twenty miles per hour (or 1760 feet per minute) would require a 13.25 inch diameter rotor to operate at approximately 507 rotations per minute in order for the material to exit the vehicle at zero velocity relative to the road. In order to determine how much oil must flow to the rotor motor 26, the rotor speed and the rotor motor capacity are used in the calculation. Generally, $$Flow = \frac{\omega (Capacity_{rotor})}{231 \frac{in^3}{gal}}.$$

For a 2.8 cubic inch rotor motor in the above example, approximately 6.1 gallons of flow per minute are required to the rotor motor 26 in order for the material to exit the vehicle at zero velocity when the vehicle 20 is travelling at twenty miles per hour. Table 1 shows approximations for different flow requirements for different rotor motors and vehicle speeds.

TABLE 1

| Vehicle Speed (mph) | Vehicle Speed (ft/min) | Rotor Rotational Velocity (13.25" Diameter Rotor) | 2.8 in³ Rotor Motor Flow Rate (gal/min) | 3.6 in³ Rotor Motor Flow Rate (gal/min) | 4.0 in³ Rotor Motor Flow Rate (gal/min) |
|---|---|---|---|---|---|
| 20 | 1760 | 507 | 6.1 | 7.9 | 8.8 |
| 25 | 2200 | 634 | 7.7 | 9.9 | 10.9 |
| 30 | 2640 | 761 | 9.2 | 11.9 | 13.0 |
| 35 | 3080 | 888 | 10.8 | 13.8 | 15.2 |
| 40 | 3520 | 1015 | 12.3 | 15.8 | 17.4 |
| 45 | 3960 | 1142 | 13.8 | 17.8 | 19.6 |
| 50 | 4400 | 1268 | 15.4 | 19.8 | 21.7 |

The amount of material that is deposited on the road will be adjusted by altering the auger speed according to the equation $$A = \frac{(V_{vehicle})(R_{material})}{60}$$

where A is the auger discharge rate (per minute), $V_{vehicle}$ is the vehicle speed (mph), and $R_{material}$, is the application rate of material per lane-mile. For example, If 200 pounds of material per lane-mile is desired, the auger would have to convey about 67 pounds of material per minute when the vehicle is traveling at twenty miles per hour. Table 2 shows the approximate requirements for varying speeds and application rates.

TABLE 2

| Vehicle Speed (mph) | Application Rate (lbs/lane mile) | Auger Discharge Rate (lbs/min) |
|---|---|---|
| 20 | 200 | 67 |
| 20 | 400 | 133 |
| 20 | 600 | 200 |
| 20 | 800 | 267 |
| 25 | 200 | 83 |
| 25 | 400 | 167 |
| 25 | 600 | 250 |
| 25 | 800 | 333 |
| 30 | 200 | 100 |
| 30 | 400 | 200 |
| 30 | 600 | 300 |
| 30 | 800 | 400 |
| 35 | 200 | 117 |
| 35 | 400 | 223 |
| 35 | 600 | 350 |
| 35 | 800 | 467 |
| 40 | 200 | 133 |
| 40 | 400 | 267 |
| 40 | 600 | 400 |
| 40 | 800 | 533 |
| 45 | 200 | 150 |
| 45 | 400 | 300 |
| 45 | 600 | 450 |
| 45 | 800 | 600 |

As previously discussed, either the above equations could be stored in the control box 56, exact figures could be stored in tables such as those listed above. Methods for storing such information are common and well-known in the art.

While several preferred embodiments have been shown and described, it is understood that changes and modifications can be made to the invention without departing from the invention's broader aspects. For example, it is possible to have more or fewer individual sensors in the closed-loop control system depending on the particular needs of the user. Additionally, it is possible for the spreader to be of the tailgate, v-box or other variety while maintaining the overall functionality of the invention. The present invention is thus not limited to the described and illustrated embodiments but only by the scope and spirit of the appended claims.

What is claimed is:

1. A vehicle-mounted spreader for applying granular materials onto a surface, comprising:

a discharge spout for directing material onto the surface;

a spout-coupled rotor for moving material into the discharge spout, the rotor located generally above the discharge spout and having an axis that is generally parallel to the surface;

a hydraulic rotor motor for providing power to the rotor;

an electrohydraulic valve coupled to the rotor motor for adjusting the speed of the rotor motor;

an auger coupled to the rotor for metering specific amounts of material into the rotor;

a hydraulic auger motor for providing power to the auger;

a speedometer coupled to the vehicle for monitoring the vehicle speed; and a control box receiving information from the speedometer and the rotor motor regarding the speeds of each, the control box sending a signal to the electrohydraulic valve in order to adjust the speed of the rotor motor such that the material exits the discharge spout at zero velocity relative to the surface.

2. The vehicle-mounted spreader of claim 1, further comprising a second electrohydraulic valve coupled to the auger motor for adjusting the speed of the auger motor, wherein the control box communicates with the auger motor and sends a signal to the second electrohydraulic valve in order to adjust the speed of the auger motor.

3. The vehicle-mounted spreader of claim 2, further comprising a user-controlled switch for activating and deactivating the flow of material through the auger, the switch being coupled to the control box.

4. The vehicle-mounted spreader of claim 3, further comprising first and second speed sensors coupled to the auger motor and rotor motor, respectively, the speed sensors providing feedback signals to the control box concerning the relative speeds of the auger motor and the rotor motor.

5. A vehicle-mounted spreader for distributing material onto a surface while the vehicle is in motion across the surface, the vehicle supporting a bin for storing the material, the spreader comprising:

a discharge spout for directing the material being distributed onto the surface wherein the discharge spout has a first end forming an inlet opening, a second end forming an outlet opening and a middle portion disposed between the inlet and outlet openings, the middle portion forming a bend to modify the direction of the material being discharged, the bend forms an angle of about 90 degrees to discharge the material in a direction approximately parallel to the surface;

a rotor coupled to the discharge spout above the inlet opening for propelling the material downwardly into the inlet opening of the discharge spout, wherein the rotor has an axis of rotation that is substantially parallel to the surface;

a rotor motor coupled to the rotor for supplying power to rotate the rotor;

a conveyor coupled to the rotor and the storage bin for conveying the material from the storage bin into the rotor; and a conveyor motor coupled to the conveyor for supplying power to move the conveyor.

6. The vehicle-mounted spreader of claim 5, wherein the axis of rotation of the rotor is substantially perpendicular to the direction of motion of the vehicle.

7. A vehicle-mounted spreader for distributing material onto a surface while the vehicle is in motion across the surface, the vehicle supporting a bin for storing the material, the spreader comprising:

a discharge spout for directing the material being distributed onto the surface;

a rotor coupled to the discharge spout for propelling the material into the discharge spout, wherein the rotor has an axis of rotation that is substantially parallel to the surface;

a rotor motor coupled to the rotor for supplying power to rotate the rotor;

a conveyor coupled to the rotor and the storage bin for conveying the material from the storage bin into the rotor; and a conveyor motor coupled to the conveyor for supplying power to move the conveyor, wherein the discharge spout and the rotor cooperate to direct the material from the discharge spout onto the surface at substantially the same speed and in substantially the opposite direction as the motion of the vehicle.

8. The vehicle-mounted spreader of claim 7, wherein the rotor motor is a hydraulic rotor motor, the spreader further comprising an electrohydraulic valve for supplying hydraulic fluid to the rotor motor and a controller for applying a control signal to the valve to rotate the rotor motor such that the material being discharged onto the surface exits the spout at substantially the same speed and in substantially the opposite direction as the motion of the vehicle.

9. The vehicle-mounted spreader of claim 8, further comprising a vehicle speed sensor coupled to the controller for generating a signal representative of the speed of the vehicle, wherein the control signal being applied to the valve depends on the vehicle speed signal.

10. The vehicle-mounted spreader of claim 9, further comprising a rotor speed sensor coupled to the controller for generating a feedback signal representative of the speed of the rotor, wherein the control signal applied to the valve depends on the feedback signal.

11. The vehicle-mounted spreader of claim 7, wherein the conveyor includes an auger.

12. The vehicle-mounted spreader of claim 11, wherein the auger is configured to rotate at a rate which is set so as to meter the material being conveyed at a desired distribution rate.

13. The vehicle-mounted spreader of claim 12, wherein the conveyor motor is a hydraulic auger motor, the spreader further comprising an electrohydraulic valve for supplying hydraulic fluid to the auger motor and a controller for applying a control signal to the valve to rotate the auger motor to meter the material at the desired distribution rate.

14. The vehicle-mounted spreader of claim 13, further comprising an auger speed sensor coupled to the controller for generating a signal representative of the speed of the auger, wherein the control signal applied to the valve depends on the signal.

15. The vehicle-mounted spreader of claim 13, further comprising an auger motor speed sensor coupled to the controller for generating a feedback signal representative of the speed of the auger motor, wherein the control signal applied to the valve depends on the feedback signal.

16. The vehicle-mounted spreader of claim 15, further comprising a manually-operated switch coupled to the controller, the switch generating a signal for the controller which adjusts the speed of the auger motor in order to control the metering of material in the auger.

17. The vehicle-mounted spreader of claim 15, further comprising a manually-operated two-position switch coupled to the controller for activating and deactivating the spreader.

18. A vehicle-mounted spreader for distributing granular material, comprising:

an exit conduit for directing material away from the spreader, the exit conduit having a first end, a middle portion, and a second end;

a rotor coupled to and located generally above the first end of the exit conduit, the rotor for directing material into the first end of the exit conduit, wherein the rotor rotates about an axis that is substantially parallel to the ground;

a means for supplying power to the rotor;

a conveyer for discharging material into the rotor;

a means for supplying power to the conveyer;

a means for controlling the amount of power supplied to the rotor; and a speedometer for providing a vehicle speed signal to the control means, wherein the control means adjusts the power supplied to the rotor such that the material exits the second end of the exit conduit at substantially the same speed and in substantially the opposite direction as the vehicle.

19. The vehicle-mounted spreader of claim 18, wherein the means for supplying power to the conveyer comprises a hydraulic conveyor motor, and the means for supplying power to the rotor comprises a hydraulic rotor motor.

20. The vehicle-mounted spreader of claim 19, wherein the means for controlling the power supplied to the rotor comprises a controller for monitoring the speed of the rotor motor and the vehicle, the controller adjusting the rotor motor speed when the speed of material exiting the conduit differs from the speed of the vehicle.

21. The vehicle-mounted spreader of claim 20, further comprising means for controlling the amount of power supplied to the conveyer in order to adjust the amount of material that is discharged into the rotor.

22. The vehicle-mounted spreader of claim 21, wherein the conveyer includes an auger for metering desired amounts of material into the rotor.

23. The vehicle-mounted spreader of claim 22, wherein the means for controlling the power supplied to the conveyer comprises the controller that monitors the speed of the rotor, the controller monitoring the speeds of the rotor, conveyer motor, and the vehicle in order to adjust the conveyer motor speed when the speed of material exiting the conduit differs from the speed of the vehicle.

24. The vehicle-mounted spreader of claim 23, further comprising:

a first rotational speed sensor coupled to the conveyer motor for providing information to the controller concerning the relative speed of the conveyer motor; and a second rotational speed sensor coupled to the rotor motor for providing information to the controller concerning the relative speed of the rotor motor.

* * * * *